June 20, 1950 R. E. MARBURY 2,512,354
BRAKING SYSTEM FOR ALTERNATING CURRENT MOTORS
Filed Jan. 15, 1948
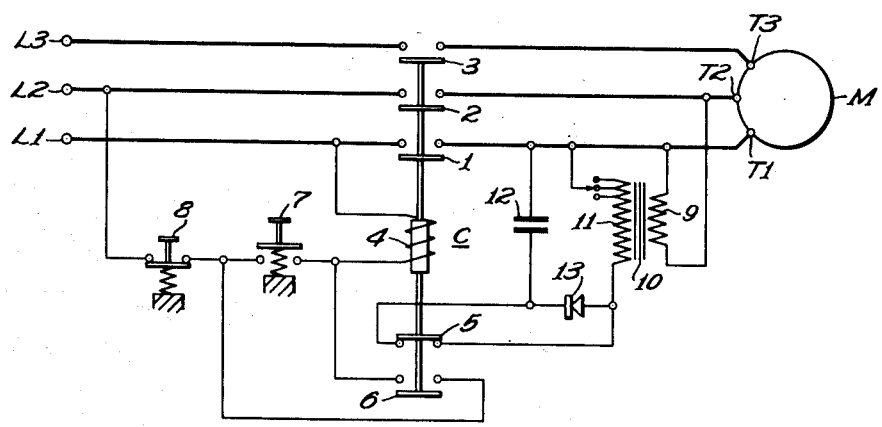
WITNESSES:
Robert A Baird
Nw. C. Groome
INVENTOR
Ralph E. Marbury.
BY
C. M. Avery
ATTORNEY Patented June 20, 1950

2,512,354

UNITED STATES PATENT OFFICE 2,512,354

BRAKING SYSTEM FOR ALTERNATING CURRENT MOTORS

Ralph E. Marbury, Wilkinsburg, Pa., assignor to Westinghouse Electric Corporation, East Pittsburgh, Pa., a corporation of Pennsylvania Application January 15, 1948, Serial No. 2,541

2 Claims. (Cl. 318—212)

1

My invention relates to alternating-current motor control systems in which immediately after the disconnection of the motor from its power supply, a capacitive discharge is passed through the motor in order to secure a quick braking or stopping. Control systems of this type are disclosed in the copending application Serial No. 668,693 of F. D. Snyder, now Patent No. 2,445,806, assigned to the assignee of the present invention.

It is an object of my invention to improve control systems of the above-mentioned type as regards reliability of braking performance or braking efficacy without appreciable increase in the cost of equipment. Another object of the invention is to permit using a considerably smaller capacitance in such systems without loss in braking performance.

According to the invention, I connect across the motor terminals the primary circuit of a step-up transformer so that the transformer is energized only when the contactor for controlling the motor is closed; and I connect across the high-voltage secondary circuit of the transformer a capacitor in series connection with a rectifier which is short-circuited by an auxiliary contact when the contactor is open. In a system designed in this manner, a capacitor of relatively small capacitance and small dimensions is capable of securing a more effective braking than under larger capacitors in the systems previously proposed, and it becomes possible and practical, if desired, to employ available small liquid paper capacitors of high reliability instead of electrolytic capacitors. A system according to the invention also permits more readily to stop the motor in not more or even less than the period of one revolution.

An embodiment of a control system according to the invention is diagrammatically shown on the drawing by way of example.

According to the drawing, an alternating current motor M of the induction type has its three terminals T1, T2 and T3 connected to respective line terminals L1, L2 and L3 under control by the main contacts 1, 2 and 3, respectively, of an electromagnetic contactor C. The control coil 4 of this contactor actuates also two interlock contacts 5 and 6 and is connected across the line terminals L1 and L2 through a normally open start contact 7 and a normally closed stop contact 8. Contacts 7 and 8 are preferably of the push-button type for actuation by an attendant, or they may consist of limit switches or the like control organs to be actuated automatically by the machinery driven by the motor M.

2

Connected across motor terminals T1 and T3 is the primary winding 9 of a transformer 10 whose secondary winding is denoted by 11. Transformer 10 is a step-up transformer, that is, its secondary voltage is much higher than the primary voltage and preferably of a higher decimal order of magnitude. For instance, a transformer ratio between 1 to 10 and 1 to 20 may be chosen.

A capacitor 12 and a rectifier 13, for instance, of the dry or junction type, are connected in series with each other across the secondary winding 11. The auxiliary contact 5 of contactor C is connected across the rectifier 13 to short-circuit the rectifier when the main contacts of contactor C are open.

When the start contact 7 is depressed by the attendant, coil 4 becomes energized so that the contactor closes its main contacts in order to start the motor. The interlock contact 6 then establishes a self-holding circuit in parallel to the start contact 7 so that the contactor remains closed when contact 7 is thereafter released. The closing of contactor C has the effect of opening the short-circuit of rectifier 13 at contact 5. The capacitor 12 is now charged through the rectifier 13 by direct current under the relatively high voltage of secondary winding 11. When thereafter the stop contact 8 is depressed, the circuit of contactor coil 4 is opened so that the main contacts 1, 2, 3 open and interrupt the power supply to the motor M. At the same time, the auxiliary contact 5 is closed and short-circuits the rectifier 13. As a result, the capacitor discharges through the contact 5 and the transformer winding 11 thus inducing a current impulse in winding 9 which is applied to the motor and produces a braking field that stops the motor.

It will be recognized that the rectifying device 13 carries current only during the short charging interval of the capacitor. Consequently, this rectifier has a relatively small current-carrying capacity and may be given very small dimensions. The system requires no timing device of any kind because shortly after the opening of the contactor the capacitive discharge current has exhausted itself, and the entire control circuit becomes deenergized.

The advantages afforded by the invention may be illustrated by a comparison relating to the braking of a three-phase four-pole induction motor of 1 H. P. with a phase voltage of 200 volts (60 C. P. S.) between any two of its field terminals. It was found that for braking this motor, under tested load conditions, from synchronous speed to stop within a period of not more than one revolution, a total capacitance of 7,000 microfarads was needed if charged at 200 volts, i. e., directly across two motor terminals in series with a rectifier. A capacitor, or a group of capacitors, totalling 7,000 microfarads represents a rather unwieldy device whose cost is uneconomically high or virtually prohibitive compared with the cost of the 1 H. P. motor; and it will be recognized that this is all the more true with larger motors or with larger inertia loads. In contrast thereto, the same braking performance with the same motor under otherwise the same conditions is secured when using a capacitor of only 31 microfarads, if this capacitor and the appertaining rectifier are impressed by secondary voltage of 3 kilovolts in accordance with the present invention. Although this requires an additional transformer, the total cost of capacitor and transformer need not be higher and may be kept lower than that of the above-mentioned much larger capacitor unit alone. Besides, the order of capacitance magnitude required in systems according to the invention is so low that there is a practically free choice of the type and design of capacitors; and it is easily possible to increase the capacitance for obtaining a more reliable or more rapid braking performance or for braking more heavily loaded motors or motors of larger horsepower value than can economically be contolled by the previously proposed systems.

The fact that, according to the invention, a much smaller capacitor can be employed for producing a braking effect in the motor equivalent to the braking heretofore obtainable only with very large capacitors will be more fully understood from the following:

The braking field set up in the motor depends upon the energy delivered by the capacitor to the motor field winding, this energy is proportional to $$\frac{CE^2}{2}$$

wherein C is the discharging capacity in microfarads and E the capacitor voltage in volts. Referring to the above-mentioned example of a capacitor of 7000 mf. charged at 200 v., the braking field energy is $$\frac{CE^2}{2} = \frac{7000 \times 200^2 \times 10^{-6}}{2} = 140 \text{ watt seconds}$$

In the above-mentioned example of a system according to the invention, using a capacitor of 31 mf. charged under 3 kilovolts, the braking field energy is $$\frac{CE^2}{2} = \frac{31 \times 3000^2 \times 10^{-6}}{2}$$

which amounts to about 140 watt seconds. Except for a small allowance to be made for losses in the transformer, this energy is applied to the motor so that the braking effect is virtually the same as in the first-mentioned example. As a matter of fact, due to the inefficiency of capacitors designed for low voltages, the use of a high-voltage capacitor in combination with a transformer, as a rule, affords more reliable results. Besides, the braking effect can be adjusted because it is readily possible to use capacitors for higher braking energies than feasible or economical with the large capacitors and because the charging voltage can also be chosen or adjusted for the desired braking effect. For instance, as shown on the drawing, the transformer secondary 11 may have a number of taps to permit a very accurate adjustment of the braking effect. It will be noted that in systems according to the invention, the braking energy is impressed on the motor at the normal terminal voltage (200 volts) and that the high voltage occurs only in a local and readily insulatable unit.

I claim as my invention:

1. A motor control system, comprising an alternating-current motor having terminals, a contactor having main contacts connected to said terminals for supplying alternating current to said motor when closed, a transformer having a primary circuit connected across said terminals and having a secondary circuit to provide secondary voltage higher than the voltage across said terminals, a capacitor and a rectifier series-connected with each other in said secondary circuit, and a normally closed auxiliary contact connected across said rectifier and controlled by said contactor to open only when said main contacts are closed, whereby said capacitor is charged through said rectifier when said main contacts are closed and passes a braking impulse through said auxiliary contact and said transformer to said motor when said main contacts open.

2. A motor control system, comprising an alternating-current motor having terminals, a contactor having main contacts connected to said terminals for supplying alternating current to said motor when closed, a step-up transformer having a primary winding connected across said terminals to be energized only when said main contacts are closed and having a secondary winding to provide secondary voltage of a higher order of magnitude than the voltage across said terminals, a capacitor and a rectifier series-connected with each other across said secondary winding, said contactor having an auxiliary contact connected across said rectifier and closed only when said main contacts are open.

RALPH E. MARBURY.

REFERENCES CITED

The following references are of record in the file of this patent:

UNITED STATES PATENTS

| Number | Name | Date |
|---|---|---|
| 1,676,312 | Alexanderson | July 10, 1928 |
| 2,434,919 | Girard | Jan. 27, 1948 |